Patented July 27, 1926.

1,593,752

UNITED STATES PATENT OFFICE.

THOMAS JOHN IRELAND CRAIG, OF MANCHESTER, ENGLAND, ASSIGNOR TO PETER SPENCE AND SONS LIMITED, OF THE MANCHESTER ALUM WORKS, OF MANCHESTER, ENGLAND.

FIREPROOFING OF TEXTILE FIBERS AND FABRICS AND OTHER POROUS OR ABSORBENT SUBSTANCES OR ARTICLES.

No Drawing. Application filed November 2, 1925. Serial No. 66,389, and in Great Britain August 18, 1924.

This invention has reference to the treatment of textile fibres and fabrics and other porous or absorbent substances or articles, to render them less inflammable, by treating such a substance or article with a solution of alkali aluminate and afterwards acting upon the deposited aluminate in the substance or article with carbon dioxide in suitable form.

According to one such known method of fireproofing porous or absorbent substances or articles, the substance or article is impregnated with sodium aluminate and the aluminate deposited in the substance is acted upon, in the presence or absence of moisture, with an atmosphere largely composed of carbonic acid gas at a temperature of about 80° C., but which may reach as much as 100° C. According to another known method (see British Patent No. 16,153 A. D. 1914) the aluminated substance or article is treated with a liquid source of carbon dioxide, such as a solution of acid alkali carbonate, at a temperature of about 85° C., for a suitable time. It has, however, been found in practice that in each method the time required to fix or produce the fireproofing body in or on the substance or article, in such a condition that the fireproofing effect is efficiently retained after repeated washings with soap and water, is several minutes, extending, for example, to fifteen minutes or even half an hour, according to the nature of the material.

In the said British patent there is also described a treatment of the aluminated substance or article with acid sodium carbonate solution under pressure when the temperature of the solution may reach some degrees above 100° C. The necessity for either a prolonged treatment in the solution or the use of increased pressure has serious disadvantages in the limitation of output and the complication of the apparatus required.

Now I have found that I am able to obtain the improved effects resulting from prolonger treatment or increased pressure by simpler means which enable me rapidly and efficiently to produce and fix the fireproofing body.

According to this invention the fabric or other porous or absorbent substance or article (hereinafter referred to as fabric) after being aluminated and acted upon with $CO_2$ (either in an atmosphere of or containing carbon dioxide gas or in a liquid source of carbon dioxide), is treated for a short period of time with a boiling or nearly boiling solution which at or near its boiling point has a temperature over 100° C. at ordinary atmospheric pressure and which will not have an appreciable deteriorating action on the fixation of the fireproofing body, or upon the fireproofing body itself. Such solution may be a sufficiently strong solution of a salt which will fix or further assist in fixing the fireproofing body in or upon the fabric. Such salt may be preferably alkali carbonate, e. g. sodium carbonate, or it may be at the commencement of its use a salt (e. g. common salt, potassium chloride or sodium sulphate) or a mixture of salts such as will, while affording the desired temperature effect, not have an appreciable deteriorating action on the fixation of the fireproofing body or upon the fireproofing body itself. The solution may contain a relatively small proportion of acid alkali carbonate, or such small proportion of acid alkali carbonate may be acquired as the treatment proceeds.

The following is an example of how I may conveniently carry the invention into effect. The fabric is immersed in or otherwise treated with a solution of alkali aluminate at a strength adjusted to the quality of the material under treatment. For instance, for flannelette weighing about 27 lbs. per 100 square yards a solution of sodium aluminate at about 1.15 specific gravity and containing about 8% $Al_2O_3$ and 6% $Na_2O$, may be used, and I may add, preferably, to this solution, a proportion of sodium carbonate e. g. about 7.5 parts by weight to every 100 parts by weight of solution. After saturation of the fabric with the aluminate solution the excess of the latter is squeezed out and the impregnated fabric is preferably dried. In some cases, however, for instance where a fireproofed fabric is not to be subjected to washing, the drying, after aluminating and squeezing, may be dispensed with.

The aluminated fabric, dried or otherwise, is then immersed for a short period of time (e. g. about a quarter to half a minute more or less) in a hot saturated or nearly saturated solution of sodium bicarbonate preferably at a temperature of from 50° C. to near the temperature at which carbon dioxide gas begins to be driven off from the solution to a material extent. The acid alkali carbonate, it will be understood, is gradually deprived of carbon dioxide by the aluminated fabric but is nevertheless active as long as a sufficient proportion of acid alkali carbonate is present in the solution. To replace the carbon dioxide removed by the aluminated fabric from the acid alkali carbonate liquor I may add to the latter from time to time fresh portions of acid alkali carbonate, for instance sodium bicarbonate, or I may refresh the exhausted or partly exhausted acid alkali carbonate liquor by passing into it carbon dioxide gas or a mixture of gases containing carbon dioxide.

To fix the fireproofing body securely in the fabric, the latter, after immersion in the acid carbonate is squeezed to remove excess of adhering liquor and preferably at once immersed for a short period of time (e. g. from about a quarter to half a minute) in a solution of sodium carbonate maintained at or nearly at the boil and of such strength (e. g. having at 100° C. a specific gravity of 1.17 or thereabouts) that its temperature reaches a little over 100° C. at or near the point of ebullition.

It is to be understood that the fabric, even after having been squeezed after treatment with the acid alkali carbonate solution, may still retain a certain quantity of such solution and carry this forward into the high temperature solution.

After the fabric has been treated in the high temperature bath it may be squeezed and washed by known means to recover from it the soluble salts. The washed fabric may then be dried or otherwise suitably dealt with to finish it in merchantable form.

The operations as described in the above example may be carried out with flannelette for instance and the like goods in a continuous manner by known means such as are used in the arts for dealing with textile fabrics, thus enabling a large production of fireproofed fabric to be obtained in a comparatively short time.

In order to minimize the amount of carbon dioxide required by the alminated fabric when immersed in the acid alkali carbonate solution, I may, if desired, subject the aluminated fabric, prior to its immersion in the acid alkali carbonate bath, to the action of the carbon dioxide of the air and/or to the action of gas containing carbon dioxide. In some cases, where sufficient carbon dioxide is thus retained in the aluminated fabric to form, or fix the fireproofing body when the aluminated and carbon dioxide treated fabric is subsequently treated in the high temperature bath, I may even dispense with the treatment in acid alkali carbonate solution. For example, the aluminated fabric may, preferably after being dried, be subjected under suitable conditions of temperature (e. g. about 35° C. at atmospheric pressure) to the action of carbon dioxide gas or a gas containing carbon dioxide, in the presence of moisture, until the required amount has been absorbed by the aluminated fabric. The fabric may then be at once immersed in the high temperature bath and be further dealt with as hereinbefore described.

I do not confine myself to the particular examples of specific gravities, temperatures, times and other conditions set out above, which are given for purpose of illustration only.

What I claim as my invention and desire to secure by Letters Patent is:—

1. The process of fireproofing absorbent materials which consists in treating the material with an alkali aluminate, then treating the material with carbon dioxide and then immediately treating the material with a salt solution which near its boiling point has a temperature of over 100° C. at ordinary atmospheric pressure, and which will not have an appreciable deteriorating action on the fixation of the fireproofing body or upon the fireproofing body itself.

2. The process of fireproofing absorbent materials at atmospheric pressure which consists in treating the material with an alkali aluminate, then treating the material with carbon dioxide and then immediately treating the material with an alkali carbonate which near its boiling point has a temperature of over 100° C., and which will not have an appreciable deteriorating action on the fixation of the fireproofing body or upon the fireproofing body itself.

3. The process of fireproofing absorbent materials at atmospheric pressure which consists in treating the material with an alkali aluminate, then treating the material with carbon dioxide and then immediately treating the material with an acid alkali carbonate which near its boiling point has a temperature of over 100° C., and which will not have an appreciable deteriorating action on the fixation of the fireproofing body or upon the fireproofing body itself.

4. The process of fireproofing absorbent materials at atmospheric pressure which consists in treating the material with an alkali aluminate, then treating the material with a carbon dioxide gas, then treating the solution with a carbon dioxide solution, and then immediately treating the material with an alkali carbonate solution which near its boiling point has a temperature of over 100° C., and which will not have an appreciable deteriorating action on the fixation of the fireproofing body or upon the fireproofing body itself.

In witness whereof I have hereunto set my hand.

THOMAS JOHN IRELAND CRAIG.